Nov. 3, 1964 R. SIMON 3,154,927
HEAT PUMPS
Filed Feb. 17, 1964

INVENTOR.
RALPH SIMON
BY GRAY, MASE, & DUNSON
ATTORNEYS
BY Philip M. Dunson

United States Patent Office 3,154,927
Patented Nov. 3, 1964

3,154,927
HEAT PUMPS
Ralph Simon, Columbus, Ohio, assignor to Battelle Memorial Institute, Columbus, Ohio, a corporation of Ohio
Filed Feb. 17, 1964, Ser. No. 345,486
13 Claims. (Cl. 62—3)

This invention relates to heat pumps. It has to do particularly with apparatus for pumping heat by means of the Ettingshausen effect.

Typical apparatus according to the present invention includes an essentially annular member of material for which the Ettingshausen effect figure of merit is substantial, means for providing an alternating magnetic field in the member in a direction orthogonal to its radial direction, and means for providing in the member an alternating current of the same frequency and substantially the same phase as in the magnetic field and in a direction orthogonal thereto, the heat pumping thus being produced unidirectionally in the member in the direction orthogonal to the magnetic field and to the current. Such apparatus is especially useful for cooling a desired region below the ambient temperature for purposes such as refrigeration, but may also be used for various other purposes such as for aiding or opposing other conditions of heat flow in a system, such as for heating a region above ambient temperature.

Figure 1:
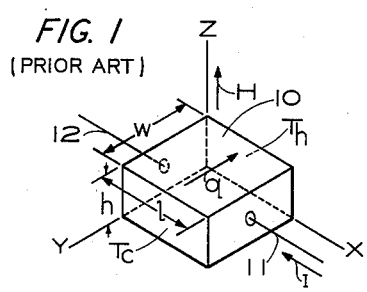
FIG. 1 is an isometric view, partly schematic, of a simple device in the prior art illustrating the Ettingshausen effect.

Referring now to FIG. 1, a specimen 10 made of a material for which the Ettingshausen effect figure of merit is substantial, such as a semiconductor or a semimetal, has the shape of a rectangular parallelopiped of length $l$, width $w$, and height $h$. The specimen 10 is shown with its length, width, and height parallel to the X, Y, and Z axes respectively of a conventional rectangular coordinate system. When a voltage is connected by the conductors 11, 12 across opposite faces of the specimen 10, providing a current in the X direction, as indicated by the arrow I, in the presence of a magnetic field in the Z direction, as indicated by the arrow H, heat is pumped in the Y direction, as indicated by the arrow $q$, thus producing a temperature gradient $(T_h-T_c)/w$ in the Y direction. The transverse temperature gradient resulting from the above-described combination of voltage and magnetic field is called the Ettingshausen effect.

The temperature difference developed under conditions of no heat flow into or out of the specimen 10 is given by $T_h-T_c = NH\overline{T}I/Kh$, where N is the Ettingshausen-Nernst coefficient that is characteristic of the material, $\overline{T}$ is the mean temperature, $(\frac{1}{2})(T_h+T_c)$, and K is the thermal conductivity of the specimen in the Y direction. The quantities N and K are evaluated at the temperature $\overline{T}$ and for the magnetic field H, since they both depend upon T and H. The combination of electric current in the X direction and magnetic field in the Z direction thus results in heated pumped at a rate $NH\overline{T}I/w$ from the face at temperature $T_c$ to that at temperature $T_h$ and, at equilibrium, an equal rate of heat flow back down the temperature gradient through the specimen under open-circuit thermal load conditions.

It is seen from the above discussion that the quantity $NH\overline{T}$ is analogous to the ordinary Peltier coefficient that relates to the heat pumped by an electrical current in the same direction as the current flow. The quantity NH is, hence, analogous to the Seebeck coefficient (thermoelectric power) and may be expressed in the same physical units as customarily used for the Seebeck coefficient, namely microvolts per degree centigrade.

It is to be noted that the heat pumping effect and resultant temperature difference developed depend upon the product of H and I. If both H and I are reversed in direction, the direction as well as the magnitude of heat pumping will remain the same. Therefore, unidirectional heat pumping can be produced in apparatus employing the Ettingshausen effect operated on either direct current or alternating current.

Where alternating current is supplied through the material, the magnetic field must alternate substantially in phase with the current through the material. Thus the magnetic field should be provided by an electromagnet supplied with current having the same frequency as the current through the material and essentially in phase with it. The present invention relates to such apparatus, typical embodiments of which are shown in FIGS. 2–7.

Figure 2:
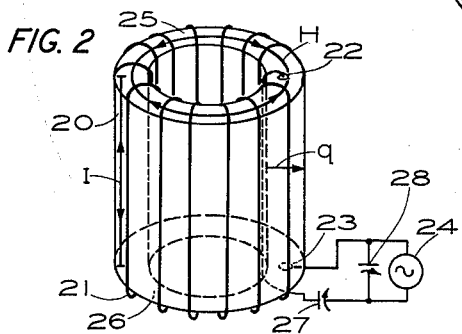
FIG. 2 is a perspective view, partly schematic, of a typical heat pump according to the present invention.

In FIG. 2 an annular member 20 is provided of material such as a semiconductor or a semimetal in which the Ettingshausen effect figure of merit is substantial. A toroidal winding 21 around the annular member 20 is connected in series with the member 20, as is indicated at 22 and 23, across a source 24 of alternating current. The alternating current flows axially, as is indicated at I, between the upper annular surface 25 and the lower annular surface 26 of the member 20. The surfaces 25 and 26 are coated with conductive material such as a metal plated thereon to assure that the current is evenly distributed around the member 20. The toroidal coil 21 is designed to operate on the same amount of current that is desired in the member 20 so that the winding 21 and the member 20 can be connected in series to assure that the current I and the magnetic field H produced by the current in the winding 21 are substantially in phase. The magnetic field of course is provided in the circumferential direction as in indicated at H in FIG. 2.

Heat is pumped in the radial direction between the inner cylindrical surface and the outer cylindrical surface of the member 20, as is indicated by the arrow $q$. Thus the region inside the annular member 20 is cooled below the temperature that would prevail in the absence of the heat pumping. Where it is desired to pump heat from outside the member 20 to inside the member 20, the connections between the winding 21 and the member 20 are reversed, thus causing heat to be pumped in the opposite direction, from the outer surface to the inner surface.

Also shown in the circuit of FIG. 2 are a series capacitor 27 and a parallel capacitor 28, which can be adjusted if necessary to improve the impedance match between the voltage source 24 and the circuit connected thereto. Where the impedance match is good enough without one or both of the condensers 27, 28, the unnecessary capacitor or capacitors may be omitted by disconnecting the parallel capacitor 28 or by shorting across the series capacitor 27, or by doing both of these things.

Figure 3:
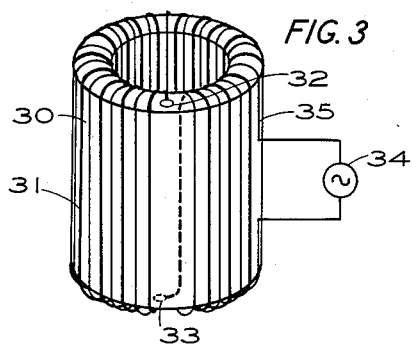
FIG. 3 is a similar view showing an alternative form of the device in FIG. 2.

The apparatus of FIG. 3 is similar to that of FIG. 2. An annular member 30 is connected in series with a toroidal winding 31 as is indicated at 32 and 33 so that any voltage induced in the winding 31 provides an axial current between the upper and lower annular surfaces of the member 30. A source 34 of alternating voltage is connected across a second toroidal winding 35 around the annular member 30, producing a circumferential magnetic field in the member 30 and inducing alternating current in the first toroidal winding 31.

The apparatus of FIG. 3 operates in the same manner as does the apparatus of FIG. 2. The axial current between the upper and lower annular surfaces of the annular member 30 and the circumferential magnetic field produced in the member 30 alternate substantially in phase with each other and thus pump heat in the direction orthogonal to the directions of the current and the magnetic field, namely the radial direction.

Figure 4:
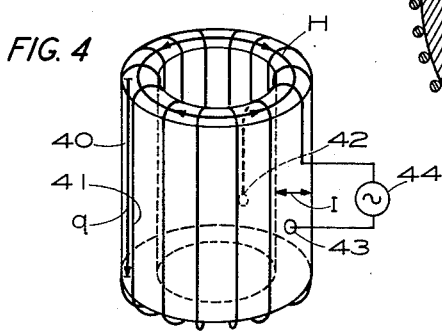
FIG. 4 is a similar view of another typical heat pump according to this invention.

In FIG. 4 an annular member 40 of material for which the Ettingshausen effect figure of merit is substantial is provided with a circumferential magnetic field, as is indicated at H, by a toroidal winding 41 around the member 40. The winding 41 is connected in series with the member 40, as is indicated at 42 and 43, across a source 44 of alternating voltage. The connection 42 is made to the inner cylindrical surface of the annular member 40 and the connection 43 is made to the outer cylindrical surface of the annular member 40, both surfaces being coated throughout with a conductive material such as a metal plated on the surfaces. Thus the current flows between the inner and outer cylindrical surfaces of the member 40, as is indicated at I. By virtue of the Ettingshausen effect, heat is pumped in the direction orthogonal to the circumferential magnetic field and the radial current, namely in the axial direction, as is indicated at $q$. The impedance matching capacitors of FIG. 2 or the inductive coupling of FIG. 3 may of course be used where desired in the apparatus of FIG. 4.

Figure 5:
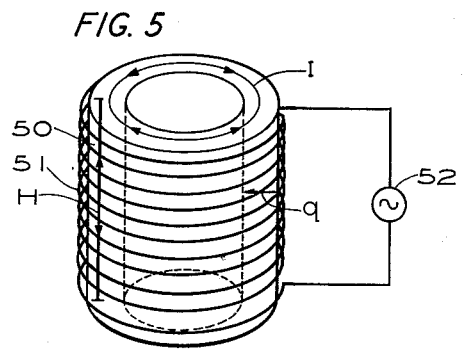
FIG. 5 is a like view of still another typical embodiment of the invention.

The apparatus of FIG. 5 comprises an annular member 50 of material for which the Ettingshausen effect figure of merit is substantial, around which is wound a helical coil 51, the ends of which are connected to a source 52 of alternating voltage. The alternating current in the helical winding 51 produces an axial magnetic field in the annular member 50, as is indicated at H; and induces a circumferentially circulating alternating current in the annular member 50, as is indicated at I. Thus it is not necessary to provide any electrical connection to the member 50 itself, which is a decided advantage in reducing the cost and avoiding undesirable heating and heat conduction paths. Heat is pumped in the radial direction from the outer surface to the inner surface of the annular member 50, as is indicated at $q$. The current I induced in the annular member 50 would be approximately 180 degrees out of phase with the current in the winding 51 when the impedance of the single-turn short circuit of the current path in the member 50 is predominantly inductive rather than resistive, as is the case at high enough frequencies.

Figure 6:
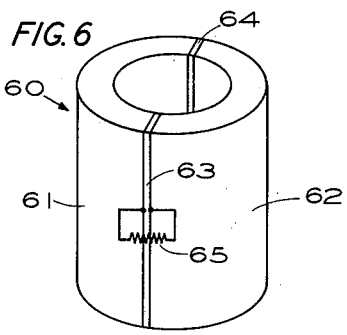
FIG. 6 is a similar view showing a modification of the device in FIG. 5.

FIG. 6 shows another form of heat pumping member 60 that can be used in place of the annular member 50 in FIG. 5. The annular member 60 comprises two semi-annular pieces 61, 62 with thin separations 63, 64 between their adjacent flat surfaces. To provide a path for the circumferential current, an electrical circuit is provided across each separation. Where the member 60 is made of two halves merely for convenience and economy of manufacture, the separations 63, 64 may comprise conductive material such as thin metallic coatings on the adjacent surfaces. Where it is desired also to improve the phase relationship between the current and the magnetic field in the member 60, at lower frequencies, the circuit across a separation may include at least one electrical impedance element, as is shown at 65. Where an impedance element 65 is included in the circuit, the separation 63 comprises an insulating material such as polystyrene.

Figure 7:
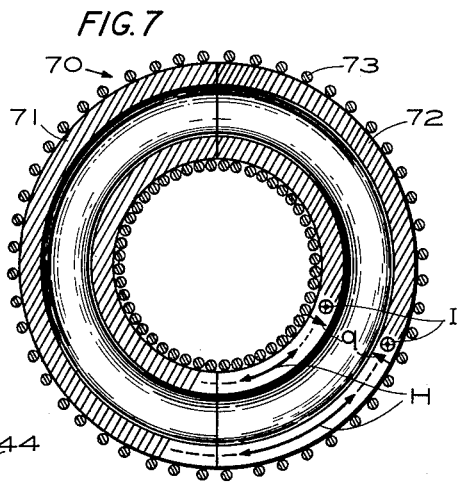
FIG. 7 is a sectional view of a modified form of heat pump of the type shown in FIG. 5.

The apparatus of FIG. 7 is similar to that of FIG. 5, but the essentially annular member 70 is elongated and shaped with its axis bent around to position the annular end surfaces adjacent to each other to form an essentially toroidal shell; thus confining the magnetic field substantially within the toroidal shell 70 and providing substantially maximum heat insulation around the inner surface of the shell. For convenience in fabricating and in using the apparatus of FIG. 7, the essentially annular member 70 may comprise two or more parts such as the two halves 71 and 72. The circumferential winding 73 is supplied with alternating current, producing an axial magnetic field H and inducing a circumferential current I in the member 70. The axial magnetic field H and the circumferential current I cause heat to be pumped in the radial direction, as is indicated at $q$. The features shown in FIG. 6 may of course be included in the apparatus of FIG. 7 where desired.

To summarize, typical apparatus according to this invention for pumping heat unidirectionally comprises an essentially annular member 20, 30, 40, 50, 60, 70 of material for which the Ettingshausen effect figure of merit is substantial, means for providing an alternating magnetic field H in the member in a direction orthogonal to its radial direction, and means for providing in the member an alternating current I of the same frequency and substantially the same phase as in the magnetic field H and in a direction orthogonal thereto, the heat thus being pumped in the member in the directional, as indicated by $q$ in the drawings, orthogonal to the magnetic field H and to the current I. In FIGS. 2 and 3, the alternating magnetic field H is provided in the circumferential direction and the alternating current I is provided in the axial direction, the heat thus being pumped in the radial direction. In the apparatus of FIG. 4, the alternating magnetic field H is provided in the circumferential direction and the alternating current I is provided in the radial direction, the heat thus being pumped in the axial direction. In the apparatus of FIGS. 5–7, the alternating magnetic field H is provided in the axial direction and the alternating current I is provided in the circumferential direction, the heat thus being pumped in the radial direction.

In FIGS. 2–7, the alternating field H is provided by an electromagnet 21, 31, 35, 41, 73 supplied with current from the same source 24, 34, 44, 52 of alternating current that provides the alternating current I in the member. In FIGS. 2–4 the electromagnet comprises a toroidal winding 21, 31, 35, 41 around the member, providing a circumferential magnetic field H therein. In FIGS. 2 and 3, the electromagnet is connected in circuit at 22, 23; 32, 33 with the member and the source of alternating current to provide current axially in the member; while in FIG. 4, the electromagnet is connected in circuit at 42, 43 with the member and the source of alternating current to provide current radially in the member. Series connections are shown in FIGS. 2–4, but the winding and the member can be connected in parallel where desired, provided that suitable circuit elements are included to obtain the desired substantially in-phase relationship between the magnetic field and the current through the member.

In FIG. 5, the electromagnet comprises a circumferential winding 51 around the outer cylindrical surface of the member, providing an axial magnetic field therein. The alternating field in the electromagnet 51 induces alternating current in the circumferential direction in the member, the heat thus being pumped in the radial direction between the inner and outer cylindrical surfaces of the member. In FIG. 6, radial separations 63, 64 are provided in the member 60, with an electrical circuit 64, 65 across each separation. The circuit across the separation 63 includes at least one electrical impedance element 65 for providing substantially the optimum phase relationship between the magnetic field and the current in the member.

In FIG. 7, the essentially annular member 70 is elongated and shaped with its axis bent around to position the annular end surfaces adjacent to each other to form an essentially toroidal shell, thus confining the magnetic field H substantially within the member and providing substantially maximum heat insulation around the inner surface of the shell. The essentially toroidal shell is shown for convenience as being circular, but any topologically equivalent shape may be used where desired for heating or cooling a device or a system to be surrounded by the member 70 or a device or a system that surrounds part of the member 70 where fluid flows inside the member 70 to conduct heat to it or away from it.

In the description and the claims, the term "essentially annular" includes not only the shapes shown in FIGS. 2–7 but also any other topologically equivalent shape in which the current, magnetic field, and heat pumping can be produced in ways equivalent to those disclosed herein. The members may be short or tall, symmetrical or unsymmetrical. Cross sections perpendicular to the axis may be elliptical, rectangular, or other shapes, and may vary in size and shape at different heights along the axis. For example, the annular ends 25, 26 in the member 20 of FIG. 2 can be shrunk down in diameter or folded in to substantially surround a device or system to be heated or cooled. The devices of FIGS. 2–4 may be made of two or more parts as in FIG. 6, with no electrical connection or circuit needed between the parts. Similarly the member 50 in FIG. 5 can be made of a number of shorter annular pieces stacked and glued or otherwise held together. And obviously many modifications may be made in the type of device shown in FIG. 7. No attempt is here made to describe or mention all of the possible equivalent forms or ramifications of the invention. It is to be understood that the words used are terms of description rather than of limitation, and that various changes, as in shape, proportion, and relative size of components, may be made without departing from the spirit or scope of the invention.

It is desirable, however, that the heat pumping apparatus be of optimum geometric design, fabricated of optimum materials, and operate at the optimum driving current for the particular conditions in which it is used.

Optimization with respect to the electrical current requires a different analytical consideration from that for the conventional Peltier heat pump. For the latter the rate of heat pumping varies as the first power of the current and the Joule heating varies as the square of the current. For the Ettingshausen alternating current heat pump, however, both effects vary as the square of the current, since the heat pumping rate depends upon $HI$ and $H$ is proportional to $I$. The optimum current for the Ettingshausen alternating current device may be determined by the nature of the nonlinear variation of $NH\overline{T}$ with $H$ rather than by Joule heating. The Ettingshausen-Nernst coefficient $N$ is essentially constant for small values of $H$, but at a large enough value of $H$, $N$ begins to decrease rapidly with increasing $H$. The value of $H$ at which the rapid decrease of $N$ begins depends upon the concentrations, effective masses, and mobilities of the electrical charge carriers (electrons and holes) in the material and also on the contribution of the atomic lattice vibrations to the thermal conductivity. Hence, $NH\overline{T}$ increases in direct proportion to $H$ for small values of $H$ and thereafter decreases in inverse proportion to $H$ for large values of $H$.

The coefficient of performance is the ratio of the rate of heat pumping to the electrical power input. It is a function of $T_c$, $T_h$, and the Ettingshausen effect figure of merit $(NH)^2 C\overline{T}/K$, where $C$ is the electrical conductivity in the current direction and $K$ is the thermal conductivity in the heat-flow direction. Since $N$, $C$, and $K$ are functions of $H$, and $H$ is proportional to $I$, the figure of merit should be evaluated at some intermediate value of $H$, to be determined by analysis between $H=0$ and the maximum value of $H$ corresponding to the amplitude of the optimum current.

Materials with large and essentially equal concentrations of high mobility electrons and holes (nearly intrinsic material) should yield enhanced values of the Ettingshausen-Nernst coefficient $N$, which is desirable since the figure of merit varies as $N^2$, provided that the concentrations of charge carriers are not so great that a considerable degree of Fermi degeneracy exists in their energy distributions. These requirements entail a material with an energy difference between the valence band maximum and the conduction band minimum ranging from a small gap (semiconductor) to some overlap of these two bands (semimetal) at the temperature $\overline{T}$. Charge transport by both electrons and holes results in enhancing the transverse heat transport produced by the magnetic field because of the ambipolar diffusion effect. Also, the greater the mobilities of the electrons and holes, the smaller is the magnitude of the magnetic field required to obtain a given value of $NH$. In addition, a material with a lower value of the lattice vibration contribution to the thermal conductivity would yield a higher value of the Ettingshausen effect figure of merit.

What is claimed is:

1. Apparatus for pumping heat unidirectionally comprising: an essentially annular member of material for which the Ettingshausen effect figure of merit is substantial; means for providing an alternating magnetic field in the member in a direction orthogonal to its radial direction; and means for providing in the member an alternating current of the same frequency and substantially the same phase as in the magnetic field and in a direction orthogonal thereto; heat thus being pumped in the member in the direction orthogonal to the magnetic field and to the current.

2. Apparatus according to claim 1, wherein the alternating magnetic field is provided in the circumferential direction and the alternating current is provided in the axial direction; the heat thus being pumped in the radial direction.

3. Apparatus according to claim 1, wherein the alternating magnetic field is provided in the circumferential direction and the alternating current is provided in the radial direction; the heat thus being pumped in the axial direction.

4. Apparatus according to claim 1, wherein the alternating magnetic field is provided in the axial direction and the alternating current is provided in the circumferential direction; the heat thus being pumped in the radial direction.

5. Apparatus according to claim 1, wherein the alternating magnetic field is provided by an electromagnet supplied with current from the same source of alternating current that provides the alternating current in the member.

6. Apparatus according to claim 5, wherein the electromagnet comprises a toroidal winding around the member, providing a circumferential magnetic field therein.

7. Apparatus according to claim 6, wherein the electromagnet is connected in circuit with the member and the source of alternating current to provide current axially in the member; the heat thus being pumped in the radial direction, between the inner and outer cylindrical surfaces of the member.

8. Apparatus according to claim 6, wherein the electromagnet is connected in circuit with the member and the source of alternating current to provide current radially in the member; the heat thus being pumped in the axial direction between the annular end surfaces of the member.

9. Apparatus according to claim 5, wherein the electromagnet comprises a circumferential winding around the outer cylindrical surface of the member, providing an axial magnetic field therein.

10. Apparatus according to claim 9, wherein the alternating field in the electromagnet induces alternating current in the circumferential direction in the member; the heat thus being pumped in the radial direction between the inner and outer cylindrical surfaces of the member.

11. Apparatus according to claim 10, wherein at least one radial separation is provided in the member, with an electrical circuit across each separation.

12. Apparatus according to claim 11, wherein a said circuit includes at least one electrical impedance element for providing substantially the optimum phase relationship between the magnetic field and the current in the member.

13. Apparatus according to claim 10, wherein the essentially annular member is elongated and shaped with its axis bent around to position the annular end surfaces adjacent to each other to form an essentially toroidal shell, thus confining the magnetic field substantially within the member and providing substantially maximum heat insulation around the inner surface of the shell.

References Cited in the file of this patent

UNITED STATES PATENTS

| | | |
|---|---|---|
| 3,075,096 | Newell | Jan. 22, 1963 |
| 3,084,267 | Newell | Apr. 2, 1963 |

FOREIGN PATENTS

| | | |
|---|---|---|
| 227,571 | Australia | Mar. 28, 1960 |

OTHER REFERENCES

"Thermoelectric and Thermomagnetic Cooling,' by H. J. Goldsmid in Industrial Electronics, June 1963, pages 467–470.

"Irreversible Thermodynamics and the Theoretical Bound on the Thermomagnetic, Figure of Merit," by M. R. El Saden in Journal of Applied Physics, vol. 33, No. 10, Oct. 1962, pages 3145–3146.

"Ettinghausen Effect and Thermomagnetic Cooling," by J. O'Brien and C. S. Wallace in Journal of Applied Physics, vol. 29, No. 7, July 1958, pages 1010–1012.